(12) United States Patent
Hille (10) Patent No.: US 9,252,692 B2
(45) Date of Patent: Feb. 2, 2016

(54) ELECTRIC-MOTOR FURNITURE DRIVE HAVING A POWER SUPPLY DEVICE

(75) Inventor: Armin Hille, Bielefeld (DE)

(73) Assignee: DEWERTOKIN GMBH, Kirchlengern (DE)

( * ) Notice: Subject to any disclaimer, the term of this patent is extended or adjusted under 35 U.S.C. 154(b) by 102 days.

(21) Appl. No.: 13/984,482

(22) PCT Filed: Feb. 8, 2012

(86) PCT No.: PCT/EP2012/052106
§ 371 (c)(1),
(2), (4) Date: Feb. 3, 2014

(87) PCT Pub. No.: WO2012/107474
PCT Pub. Date: Aug. 16, 2012

(65) Prior Publication Data
US 2014/0159618 A1    Jun. 12, 2014

(30) Foreign Application Priority Data

Feb. 9, 2011   (DE) .......................... 10 2011 000 602

(51) Int. Cl.
*F16K 31/04*   (2006.01)
*H02K 7/10*    (2006.01)
(Continued)

(52) U.S. Cl.
CPC ............. *H02P 7/0044* (2013.01); *A47C 20/041* (2013.01); *H02K 7/14* (2013.01); *H02P 29/00* (2013.01); *H02M 2001/0032* (2013.01); *Y02B 70/16* (2013.01)

(58) Field of Classification Search
CPC ........................... A47C 20/041; A47C 1/0242
USPC .......................................................... 318/15
See application file for complete search history.

(56) References Cited

U.S. PATENT DOCUMENTS 5,038,091 A * 8/1991 Bashark ...................... 318/809
5,305,482 A * 4/1994 Dewert ............................ 5/616
(Continued)

FOREIGN PATENT DOCUMENTS

DE   298 16 022   12/1998
DE   695 10 221    2/2000
(Continued)

OTHER PUBLICATIONS

International Search Report issued by the European Patent Office in International Application PCT/EP2012/052106 on Sep. 12, 2012.

*Primary Examiner* — Erick Glass
(74) *Attorney, Agent, or Firm* — Henry M. Feiereisen LLC (57) ABSTRACT

An electric-motor furniture drive includes a power supply device, a manual control for moving movable furniture components relative to each other, and an electric motor with reversible rotation direction. A speed-reducing transmission is connected downstream of the electric motor and an additional transmission is connected downstream of the speed-reducing transmission. The power supply device has a mains connection, transforms the mains-side input voltage into at least one output-side low voltage and is configured for galvanic isolation between the mains-connected input side and the output side for operating the electric-motor furniture drive. The power supply device is designed as a switched-mode power supply and has an intermediate circuit, a control device for controlling the switched-mode power supply, and a secondary unit. The power supply device provides an output-side operating voltage at the output thereof in an operating state and provides an output-side idle voltage at the output in an idle state.

26 Claims, 7 Drawing Sheets

(51) Int. Cl.
*H02P 7/00* (2006.01)
*H02P 29/00* (2006.01)
*A47C 20/04* (2006.01)
*H02K 7/14* (2006.01)
*H02M 1/00* (2007.01)

(56) References Cited

U.S. PATENT DOCUMENTS

| | | | |
|---|---|---|---|
| 5,939,803 A | 8/1999 | Frost | |
| 6,100,607 A * | 8/2000 | Olivieri et al. | 307/125 |
| 6,614,199 B1 | 9/2003 | Bokämper et al. | |
| 2004/0093969 A1* | 5/2004 | Nielsen | 74/89.23 |
| 2008/0012516 A1* | 1/2008 | Ctvrtnicek | 318/490 |
| 2009/0267420 A1* | 10/2009 | Kristensen | 307/126 |

FOREIGN PATENT DOCUMENTS

| | | |
|---|---|---|
| DE | 102006049715 | 5/2008 |
| EP | 0 887 904 | 12/1998 |
| WO | WO 88/05220 | 7/1988 |

* cited by examiner

ELECTRIC-MOTOR FURNITURE DRIVE HAVING A POWER SUPPLY DEVICE

CROSS-REFERENCES TO RELATED APPLICATIONS

This application is the U.S. National Stage of International Application No. PCT/EP2012/052106, filed Feb. 8, 2012, which designated the United States and has been published as International Publication No. WO 2012/107474 and which claims the priority of German Patent Application, Serial No. 10 2011 000 602.8, filed Feb. 9, 2011, pursuant to 35 U.S.C. 119(a)-(d).

BACKGROUND OF THE INVENTION

The invention relates to an electric-motor furniture drive having a power supply device for adjusting movable furniture components relative to one another.

Such electric-motor furniture drives are known in various embodiments. They are implemented as linear drives having a linearly adjustable output element or as rotational drives having a rotating output element and have proven themselves extremely well in practice. The linear drives have one or a number of electric motors, wherein a speed reduction gear is connected downstream from each motor and a further gear, for example, in the form of a threaded spindle gear, is connected downstream from the speed reduction gear, which further gear generates a linear movement of the output element from the rotational movement of the motor. The rotational drives have at least one speed reduction gear connected downstream from the respective electric motor, wherein the last gearing element forms the output gear. The output element of the respective electric-motor furniture drive is connected to a fixed furniture component and/or to a movable furniture component, so that the movable furniture components are adjusted relative to one another in the event of operation of the electric motor. The furniture can be implemented as a slatted frame, worktable, bed, recombinant surface, treatment couch, hospital or healthcare bed, and also a lifting device for persons such as lifters or patient lifters.

Switched power supplies have proven themselves best as the power supply devices for operating the electric-motor furniture drives. The power supply device has an operating state "off" in the event of disconnection from the network and an operating state "operation" in regular operation. The switched power supplies have a isolation transformer switched at high frequency by a control module, which can also be designated as a transformer or as a high-frequency transformer, which is turned on and off by an upstream semiconductor switch on the primary side at a high switching frequency. For this purpose, a separate intermediate circuit is assigned to the control module, which has a power source of the control module and supplies the control module with electrical power.

Document DE 10 2006 049 715 A1 illustrates a power supply for motorized drives, which is implemented in a plug housing as a switched power supply.

The prior art of a network circuit breaker or a higher-order network circuit breaker will also be discussed. The network circuit breaker, e.g., of an apartment, is introduced between the apartment installation and the public power supply network and detects whether an electrical consumer, e.g., a light, is switched on or off. The apartment installation means the electrical wiring of the apartment for the network voltage. When an electrical consumer is no longer still turned on, the network circuit breaker disconnects the apartment installation from the public power supply network. The network circuit breaker then generates a test voltage, e.g., a harmless DC voltage of a specific level, and switches it to the apartment installation. If a consumer is now switches on, it recognizes the test voltage and causes the network circuit breaker to connect the apartment installation to the public power supply network again. Such a network circuit breaker can also be used regionally or respectively for a room.

SUMMARY OF THE INVENTION

The invention is based on the object of providing an improved electric-motor furniture drive having a power supply device of the type described in greater detail hereafter.

The object is achieved with an electric-motor furniture drive having a power supply device and having a manual control for adjusting movable furniture components relative to one another, wherein the electric-motor furniture drive has at least one electric motor, which is reversible in the rotational direction, wherein a speed reduction gear is connected downstream from each electric motor and wherein a further gear is connected downstream from each speed reduction gear, and wherein the power supply device has a network terminal, which is implemented as connectable to the network, wherein the power supply device transforms the network-side input voltage into at least one output-side low voltage, and has an isolation transformer or a transformer unit for the electrical disconnection between the network-connected input side and the low-voltage-providing output side for operating the electric-motor furniture drive, wherein the power supply device is implemented like a switched power supply and has an intermediate circuit, a control unit for controlling the switched power supply, and a secondary unit, wherein the power supply device has an operating state in regular operation of the electric-motor furniture drive and an idle state when the electric-motor furniture drive is not actuated, wherein the power supply device provides at its output an output-side operating voltage in its operating state and provides at its output an output-side idle voltage, instead of the operating voltage, in its idle state.

The power supply device can provide at its output an output-side operating voltage in its operating state and, instead of the operating voltage, an output-side idle voltage in its idle state. In the idle state, a harmless and particularly power-saving small safety voltage can thus be available as a test voltage for the electric-motor furniture drive with the idle voltage. Additional auxiliary voltage sources in the form of batteries or capacitors are not necessary.

Accordingly, an electric-motor furniture drive having a power supply device and having a manual control for adjusting movable furniture components relative to one another is provided, wherein the electric-motor furniture device has at least one electric motor, which is reversible in its rotational direction, wherein a speed reducing gear is connected downstream from each electric motor, and wherein a further gear is connected downstream from each speed reducing gear, and wherein the power supply device has a network terminal, which is implemented as connectable to the network, wherein the power supply device transforms the network-side input voltage into at least one output-side low voltage, and has an isolation transformer or a transformer unit for the electrical disconnection between the network-connected input side and the low-voltage-providing output side for operating the electric-motor furniture drive, wherein the power supply device is implemented like a switched power supply and has an intermediate circuit, a control unit for controlling the switched power supply, and a secondary unit, wherein the power supply device has an operating state in regular operation of the electric-motor furniture drive and an idle state if the electric-motor furniture drive is not actuated. The power supply device provides at its output an output-side operating voltage in its operating state and an output-side idle voltage, instead of the operating voltage, in its idle state.

Therefore, the electric-motor furniture drive having this power supply device can also have an extremely low power consumption in standby operation, in which it is connected to an electrical supply network and is ready for actuation. The requirement for low power consumption of devices can thus also be met in standby operation.

In one embodiment, the power supply device may also have a load recognition unit having a sensor, and a control block, wherein the control block is connected to a reference voltage unit of the secondary unit and is implemented to switch over the output-side operating voltage into the output-side idle voltage. Simple and reliable recognition of load states can thus be provided, which can unambiguously detect the operating state and the idle state. The reference voltage unit of the secondary unit can be used to generate the different voltages. Only a few additional components are necessary.

In one alternative embodiment, the power supply device can also have a load recognition unit having a sensor, and a control block, wherein the control block is connected to a switchover unit of the secondary unit for switching over the output-side operating voltage into the output-side idle voltage. A simple switchover can thus be possible if two voltages are already present or are being generated.

The switchover unit can have a switching element which, in the deenergized state, switches the idle voltage to the output of the power supply device on the output side. The switching element can be a relay and/or a semiconductor switch, for example.

The load recognition unit can have a comparator. Depending on the scope of such a comparator, not only the operating state and the idle state can be unambiguously detected and set, but rather also intermediate states can be recognizable.

The comparator can be connected to a reference unit, whereby states can be detectable in a better way.

Still better detectability and differentiation can be achieved if the reference unit comprises a constant current source. This constant current source of the reference unit can have two parallel current paths having a pair of pnp-transistors and a pair of npn-transistors for this purpose. Therefore, particularly low currents, e.g., in the microampere range, can be controllable and can also provide satisfactory results in the case of low idle voltages. Such a constant current source can also be constructed discretely using simple components in a cost-effective manner. A further advantage can be that also in the case of test voltages of network circuit breakers having low idle voltages resulting therefrom in the idle state of the power supply device, an unambiguous load recognition can be possible and a functionality of the network circuit breaker can be maintained.

In a further embodiment, a voltage regulator can be provided for generating the idle voltage and can be connected to the operating voltage as the input voltage. This voltage regulator can be a commercially available and therefore cost-effective component.

In an alternative embodiment, the idle voltage can be continuously connected to the output of the power supply device, wherein in the operating state the operating voltage can be activated. Components can thus be saved, for example, only one closing contact and no switchover contacts are necessary.

In a further embodiment, the power supply device can have a display unit for displaying the operating voltage and the idle voltage. Two-color LEDs can be used for this purpose, in order to save installation space and obtain unambiguous displays. In a preferred embodiment, the first LED is implemented as a permanently green illuminating LED and the second LED is implemented as a red illuminating LED which can be switched on, wherein in a further embodiment a series resistor is connected to at least one LED. During operation of both LEDs, the two-color LED emits a mixed light, which can be formed by a yellow color and which is implemented as variable by adapting the at least one series resistor.

In still a further embodiment, the power supply device can be provided with a switchable and/or variable initial load, which is implemented and is temporarily connectable to the terminals of a network cable in such a manner that an unambiguous recognition of the operating state of the power supply device is formed for a network circuit breaker. The field of use can thus be expanded using network circuit breakers of different constructions.

The motor controller and/or the manual control can be provided with an auxiliary power source, whereby emergency lowering can also be possible.

The auxiliary power source can be a battery, an accumulator, and/or a capacitor.

If the idle voltage is, for example, 3 V or 5 V, it can therefore be possible that it can be sufficient to maintain further safe operation of, for example, functional elements such as processors of the motor controller and error messages or signal receivers such as radio receivers or infrared receivers or a display device or a bus device.

The operating voltage has a substantially higher potential and is typically approximately 30 V, in other embodiments in the range from 24 V to 40 V. The special advantage in switching over and/or providing the idle voltage at the output of the power supply device is that, for the power supply of the functional elements described at the beginning, this idle voltage can be used, so that separate power supply circuits of the functional elements can be omitted, and thus the installation expenditure for the electric-motor furniture drive and its individual components is substantially reduced. In addition, electric-motor furniture drives of the prior art have a substantially higher standby consumption according to their nature, since they have high-loss voltage regulator or current divider circuits, in order to adapt the functional elements described at the beginning, which cannot be operated using the high operating voltage, to the operating voltage.

A further embodiment provides a power supply device having two output-side voltages, wherein at least one voltage, for example, in the form of the idle voltage, is permanently applied and the other voltage, for example, in the form of the operating voltage, is implemented as activatable. Therefore, the output of the power supply device has, in a first and simplified embodiment, two terminals, to which the idle voltage and the activatable operating voltage are applied. A further embodiment of the power supply device has an output in the form of three terminals, wherein the idle voltage is applied via two terminals and the third terminal has the potential of the operating voltage in relation to one of the other terminals. A further and supplementary embodiment of the power supply device has an output in the form of four terminals, wherein the idle voltage is applied via two terminals and the operating voltage is applied via two further terminals. The output of the power supply device can therefore be implemented as a two-pole, a three-pole, or a four-pole terminal.

The supply cable can consist of two supply lines or wires in a so-called two-wire embodiment. In a so-called three-wire embodiment, there are three lines, and in a so-called four-wire embodiment, the supply cable has four lines.

In the case of the two-wire embodiment, the two lines of the supply cable are implemented as the positive and negative lines for both the operating voltage and also the idle voltage.

In the case of the three-wire embodiment, in addition to the positive and negative lines, a control line is provided, which conducts a control signal generated by the manual switch upon actuation thereof and causes a switchover of the power supply device from the operating voltage to the idle voltage and vice versa. One of the two lines which are provided as the positive and negative lines is a shared line (e.g., ground line for the control signal).

In the case of the four-wire embodiment, the fourth line is the ground line for the control signal, wherein control lines and positive and negative lines are embodied separately and do not use a shared line.

Further characteristics and features result from the following description of a preferred exemplary embodiment and are the subject matter of further subclaims.

BRIEF DESCRIPTION OF THE DRAWING

The invention will be explained in greater detail on the basis of the appended drawings. In the figures.

DETAILED DESCRIPTION OF PREFERRED EMBODIMENTS

Figure 1:
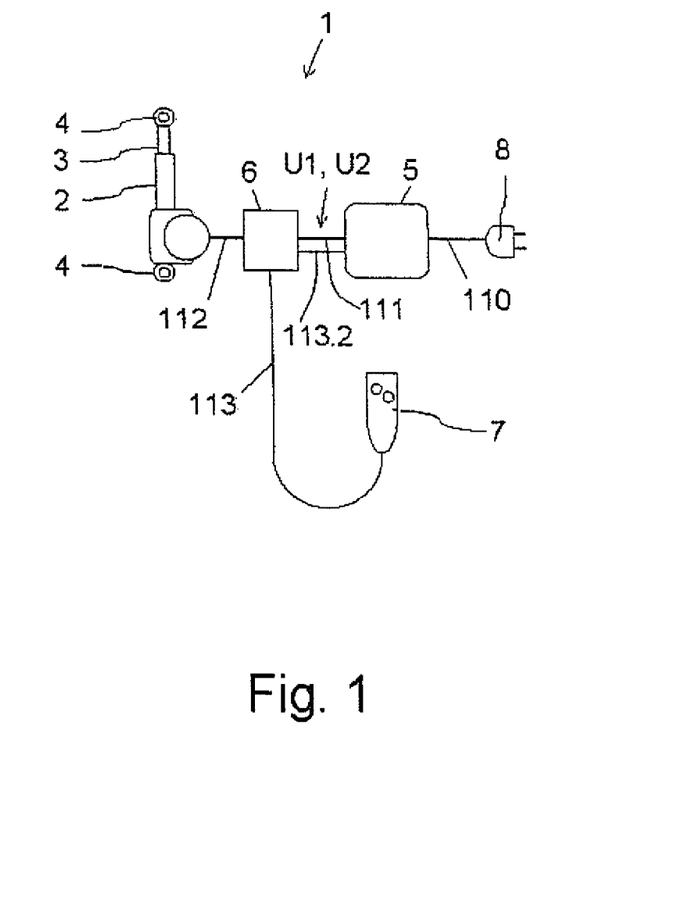
FIG. 1 shows an exemplary and schematic view of a furniture drive according to the invention, which is implemented as a linear drive, having a power supply device.

FIG. 1 shows an electric-motor furniture drive 1 having a power supply device 5.

The electric-motor furniture drive 1 is in this exemplary embodiment a so-called linear drive 2, and the power supply device 5 is implemented as a switched power supply. The linear drive 2 has a lifting pipe 3, which is extendable and retractable depending on the rotational direction of an electric motor (not shown in greater detail), on whose free end a connecting part in the form of a clevis 4 is attached. A further connecting part in the form of a further clevis 4 is fastened on the housing of the linear drive 2. The respective connecting part is connected in a way not shown in greater detail to a furniture component in each case, so that during operation of the electric motor, the furniture parts connected to the linear drive 2 move relative to one another.

According to the illustration in FIG. 1, the power supply device 5 is connected via a network cable 110 to a network plug 8, wherein in another embodiment (not shown in greater detail), the network plug 8 can be arranged on the power supply device 5. It is also to be noted that the power supply device 5 according to the illustration in FIG. 1 is provided with an enclosing housing, so that the network plug 8 can be placed or formed on the housing.

An output of the power supply device 5 is connected via a supply cable 111 to a motor controller 6, to which the linear drive 2 (also representative for more than one linear drive 2) is connected using a motor cable 112.

Furthermore, the power supply device 5 is additionally connected by a control line 113.2 to the motor controller 6 in one variant, a so-called three-wire embodiment. This variant will be explained in greater detail hereafter.

A manual control 7 is connected in wired form to an operating cable 113 at the motor controller 6, wherein according to the illustration in FIG. 1, the manual control 7 has two pushbuttons. According to another embodiment (not shown in greater detail), the manual control 7 is coupled via a wireless transmission link to the motor controller 6 and transmits radio waves or infrared light waves, for controlling the at least one electric motor, i.e., the linear drive 2, to the motor controller 6.

According to the illustration in FIG. 1, in a first embodiment, the manual control 7 is connected to a motor controller 13, wherein the motor controller 6 is implemented as a relay controller having relay switches and/or as a semiconductor circuit having semiconductor switches. The manually operable button switch of the manual control 7 switches the control current of the relay switches or the semiconductor switches, wherein the power switches of the relay switches or the semiconductor switches switch the high motor current of the linear drive 2.

According to the illustration in FIG. 1, in a second embodiment, the manual control 7 is connected to the motor controller 6, which connects the supply cable 111 of the power supply device 5 and a motor cable 112 of the electric motor of the linear drive 2 and the electric lines of the manually operable button switch of the manual control 7 to one another. According to this embodiment, the contacts of the manually operable button switch of the manual control 7 are implemented as power switches and switch the high motor current of the electric motor of the linear drive 2 in the event of a button press.

In a refining embodiment (not shown in greater detail), the power supply device 5 is inserted into the housing of the linear drive 2 or is attached thereon, wherein the linear drive 2 can be constructed like a double drive (not shown in greater detail), which receives at least one motor, but preferably two motors in a shared housing.

The network plug 8 supplies, via the network cable 110, the input-side network voltage to the power supply device 5 implemented as a switched power supply, which outputs a low voltage in the form of a DC voltage as operating voltage U1 on the secondary side and relays it to a motor controller 6. The operating voltage U1 is at the level of approximately 29 V, for example, and is used in an operating state of the power supply device 5 for operating the motor controller 6 and the linear drive 2.

In addition, the power supply device 5 outputs a further voltage on the secondary side, which is designated as the idle voltage U2, e.g., is approximately 5 V DC voltage, and is supplied in an idle state, which differs from the operating state, of the power supply device 5 to the motor controller 6 instead of the operating voltage U1. The function of the idle voltage U2 is, in the idle state, to detect an actuation of the manual control 7 and to signal this to the power supply device 5. The power supply device 5 then again provides the operating voltage U1 at its full level and performance capability to the motor controller 6 and the linear drive 2 for operation in the operating state. In another embodiment, the idle voltage U2 has a further function, in that it is used as the supply voltage of functional elements (not shown in greater detail) or forms the voltage source of functional elements (not shown in greater detail).

Figure 2:
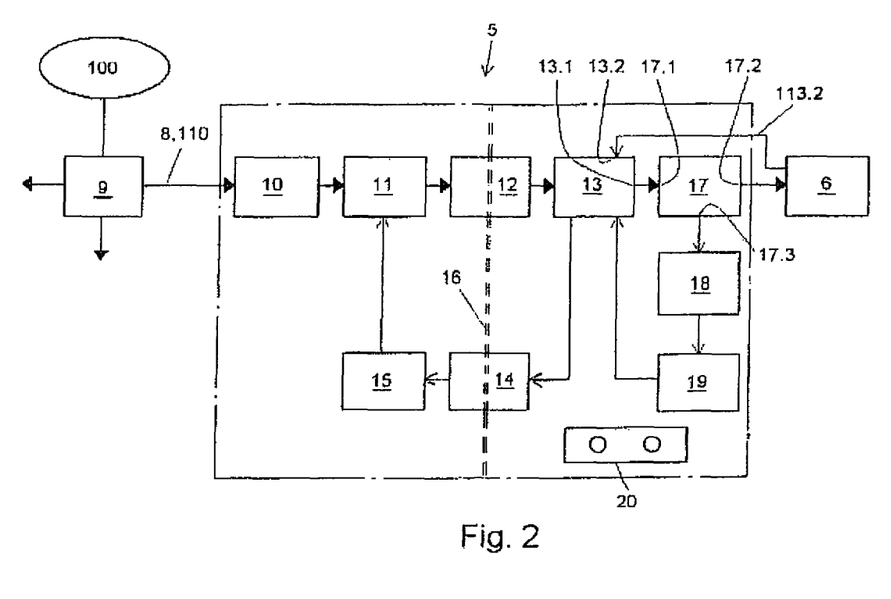
FIG. 2 shows a schematic block diagram of an exemplary embodiment of the power supply device according to FIG. 1.

FIG. 2 shows a schematic block diagram of an exemplary embodiment of the power supply device 5 according to FIG. 1.

Power lines or paths are indicated by thick lines and control lines or paths are indicated by thin lines.

The power supply device 5 has an input circuit 10, an intermediate circuit 11, a transformer unit 12, a secondary unit 13, a coupling device 14, a control unit 15, and a load recognition unit 17 having a control block 19. A signal processing unit 18 can also be connected between load recognition unit 17 and control block 19.

The input circuit 10 can be coupled on the input side (indicated by arrows) to a power supply network 100 via network plug 8 and network cable 110. For the connection to the power supply network 100, for example, a network circuit breaker 9 can be installed as a so-called higher order network circuit breaker in a household installation. The free arrows indicate connection possibilities for further consumers.

The network circuit breaker 9 releases a household installation network as soon as no electrical consumer is still connected. The network circuit breaker 9—depending on the embodiment—then applies a test voltage to the household installation network, in order to detect when a consumer is switched on. If this is the case, the network circuit breaker 9 connects the household installation network to the power supply network 100 again.

Typical network suppression elements, such as capacitors and throttles, and also fuses (not shown in greater detail here) are contained in the input circuit 10 of the power supply device 5. The input circuit 10 is connected to the intermediate circuit 11, which has a rectifier and a switching module, e.g., a switching transistor. The intermediate circuit 11 is coupled to the switching module at the transformer unit 12. The transformer unit 12 has a transformer having electrical disconnection 16, which extends through the power supply device 5. On the secondary side of the transformer unit 12, the secondary unit 13 is connected, which provides the operating voltage U1 to supply the linear drive 2 via the supply cable 17.2 to the motor controller 6 (FIG. 1). A feedback of the secondary unit 13 is arranged via the decoupling unit 14, e.g., an optocoupler 16 having electrical disconnection 16, at the control unit 15. The control unit 15 controls the switching module of the intermediate circuit 11 to regulate the operating voltage U1 and in a specific case, as explained in greater detail hereafter, also the idle voltage U2 of the secondary unit 13. For this purpose, the secondary unit 13 has a reference voltage unit (not shown).

Furthermore, the control line 113.2 (see FIG. 1) is shown, which is connected here between the motor controller 6 and the secondary unit 13.

In addition, the power supply device 5 in this exemplary embodiment has a display unit 20 which displays, for example, whether the operating voltage U1 or the idle voltage U2 is applied to the motor controller 6. This will be explained in greater detail hereafter.

The load recognition unit 17 is used to recognize whether the electric motor of the linear drive 2 (or also another additional load, for example, a reading lamp) is turned on as actuated by the manual control 7 and consumes current or is turned off. Furthermore, the load recognition unit 17 can detect whether the manual control 7 is still actuated when the linear drive 2 is switched off by an end switch, for example.

The load recognition unit 17 can also recognize when the manual control 7 is actuated in the idle state of the power supply device 5.

A further function of the load recognition unit 17 comprises switching the power supply device 5 from its operating state into its idle state if a consumer is no longer turned on, and switching the power supply device 5 from its idle state into its operating state when a consumer is to be switched on.

For this purpose, the load recognition unit 17 outputs signals based on its detected values, which are conditioned and/or processed appropriately in the signal processing unit 18 in such a manner that they can be used for further processing in the control block 19. This can consist of, for example, the signals generated by the load recognition unit 17 being lengthened or shortened with respect to time or only being relayed after a specific delay time.

The control block 19 is connected to the secondary unit 13 and controls it based on the signals of the load recognition unit 17 in such a manner that the power supply device 5 delivers the operating voltage U1 in the operating state and the idle voltage U2 in the idle state. This will be described in greater detail hereafter.

Figure 3:
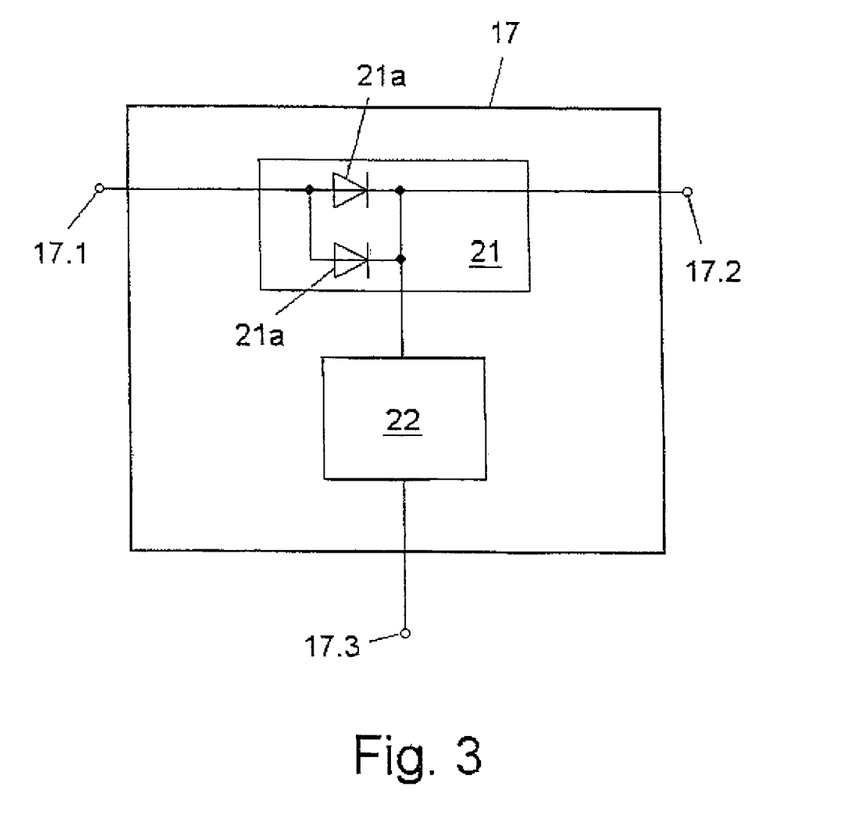
FIG. 3 shows a schematic block diagram of a first exemplary embodiment of a load recognition unit of the power supply device according to FIG. 2.

FIG. 3 shows a schematic block diagram of a first exemplary embodiment of the load recognition unit 17 of the power supply device according to FIG. 2.

The load recognition unit 17 in this exemplary embodiment comprises a sensor 21 having an input terminal 17.1 and an output terminal 17.2 and also a comparator 22 having an output terminal 17.3 (see also FIG. 2). The comparator 22 is connected to an input on the sensor.

The sensor 21 is connected in series to the motor controller 6 and therefore to the consumer(s) (see FIG. 2). The sensor 21 has at least one sensor diode 21a. Because of the current carrying capacity, two sensor diodes 21a are connected in parallel here. In the event of a current flow from 17.1 to 17.2 because of the motor controller 6, a voltage drops at the sensor 21, which is compared to a comparison value by the comparator, which is connected to an input at the cathode of the sensor diodes 21a. The comparison value can be generated and can be predetermined in various ways.

The comparator 22 outputs a signal or no signal to its output terminal 17.3 on the basis of the comparison.

The comparator 22 can be provided with an amplifier at its input.

Figure 4:
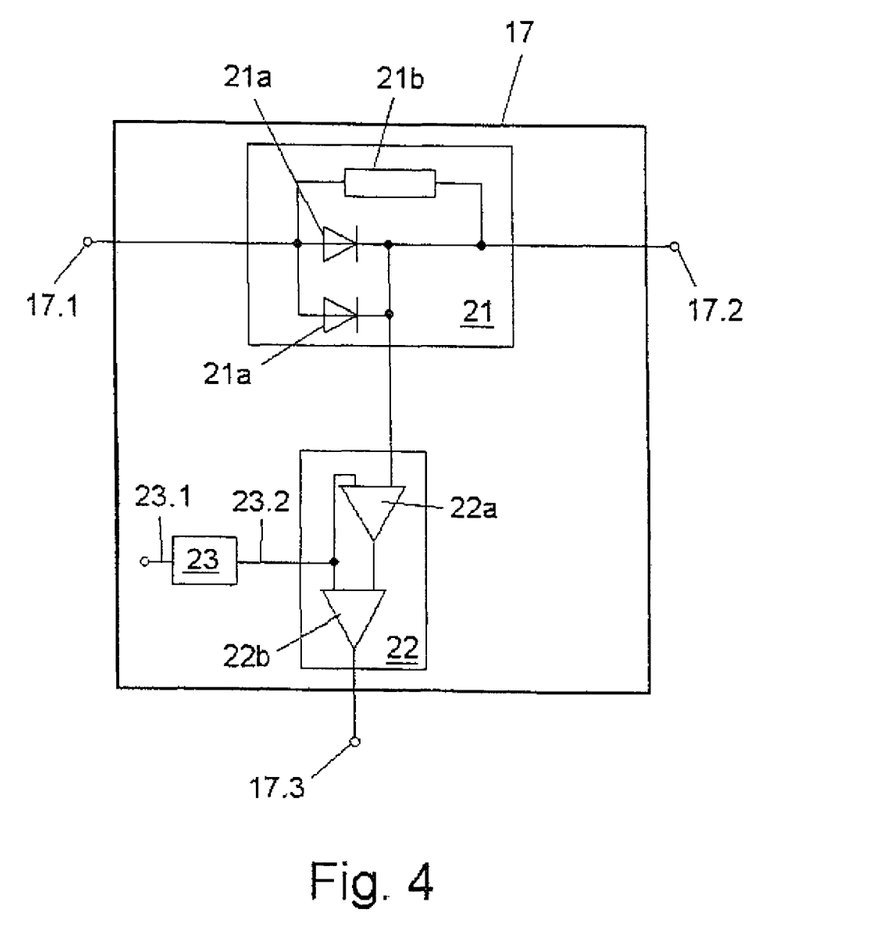
FIG. 4 shows a schematic block diagram of a second exemplary embodiment of a load recognition unit of the power supply device according to FIG. 2.

FIG. 4 shows a schematic block diagram of a second exemplary embodiment of the load recognition unit 17 of the power supply device 5 according to FIG. 2.

The second exemplary embodiment differs from the first according to FIG. 3 in the construction of the sensor 21 and in the type of the comparator 22.

A sensor resistor 21b is connected in parallel to the sensor diodes 21a. Furthermore, the comparator is constructed having a first operational amplifier 22a and a second operational amplifier 22b connected downstream. The first operational amplifier is used for amplification and the second operational amplifier 22b is used as a comparator of the amplified voltage of the sensor 21. For the comparison, the second operational amplifier 22b is connected at its inputs to the output terminal 23.2 of a reference unit 23. In other words, the reference unit 23 is supplied with the operating voltage U1 or the idle voltage U2. The reference unit 23 is, for example, a constant current source.

Figure 5:
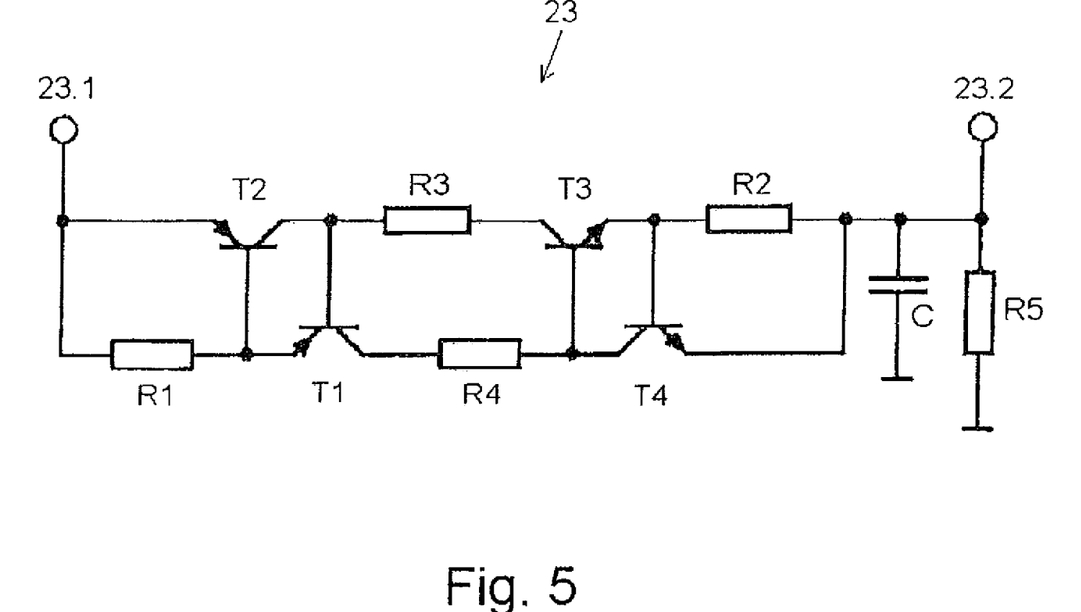
FIG. 5 shows a schematic circuit diagram of a reference unit of the load recognition unit according to FIG. 4.

An example of such a constant current source is shown in FIG. 5 as a schematic circuit diagram of the reference unit 23 of the load recognition unit 17 according to FIG. 4.

The reference unit 23 is implemented as a constant current source having the input terminal 23.1 and the output terminal 23.2. The circuit branches into two parallel current paths at the input terminal 23.1.

The first current path is a series circuit of an emitter-collector section of a pnp-transistor T2, a resistor R3, a collector-emitter section of an npn-transistor T3, and a resistor R2.

The second current path is also a series circuit of a resistor R1, an emitter-collector section of a pnp-transistor T1, a resistor R4, and a collector-emitter section of an npn-transistor T4.

The transistors T2 and T1 are connected such that the collector of the transistor T2 is connected to the base of the transistor T1, wherein the base of the transistor T2 is connected to the emitter of the transistor T1.

A connection of the transistors T3 and T4 is implemented in a similar manner, in that the base of the transistor T3 is connected to the collector of the transistor T4, and the emitter of the transistor T3 is connected to the base of the transistor T4.

A capacitor C and a resistor R5, which is parallel thereto, are connected to ground at the output terminal 23.2.

In other words, the left part of the circuit, instead of a so-called current mirror of a UBE constant current source, is constructed "mirrored", i.e., npn transistors are replaced with pnp transistors, on the right adjacent thereto. Therefore, the two circuit parts mutually delimit the current flowing through them in the two "middle" paths. Because both current paths conduct a limited current and no part of the circuit is directly connected to ground, all of the current is "used".

All of the current flowing through all of the circuit elements is constant, wherein the lowest possible power loss is achieved. No part of this current is dissipated "unused" to ground.

Also very low currents, e.g., in the microampere range, are possible by way of this circuit according to the invention. This is significant in particular for the idle state in the case of the idle voltage U2.

The circuit according to FIG. 5 is also distinguished in that it is discretely constructed using standard components.

The control block 19 receives a signal from the load recognition unit 17, which is assigned to the idle state of the power supply device 5 or the operating state of the power supply device 5.

The control block 19 can be implemented, in a way which is not shown but is easily conceivable in that, for the reference voltage generation of the reference voltage unit (not shown) of the secondary unit, it performs a switchover of the reference voltage. For this purpose, for example, by means of a transistor and a resistor, an existing voltage-determining resistor can be bypassed and/or changed. A control signal is generated by the reference voltage unit, which is supplied via the coupling unit 14 to the control unit 15. The control unit 15 sets the respective voltage, specifically the operating voltage U1 and the idle voltage U2, on the primary side on the basis of this signal and regulates these voltages in a known manner. In this manner, the power supply device 5 can deliver the operating voltage U1 for the operating state and the idle voltage U2 for the idle state. The power supply device 5 is thus implemented as switchable between the operating voltage U1 and the idle voltage U2.

Figure 6:
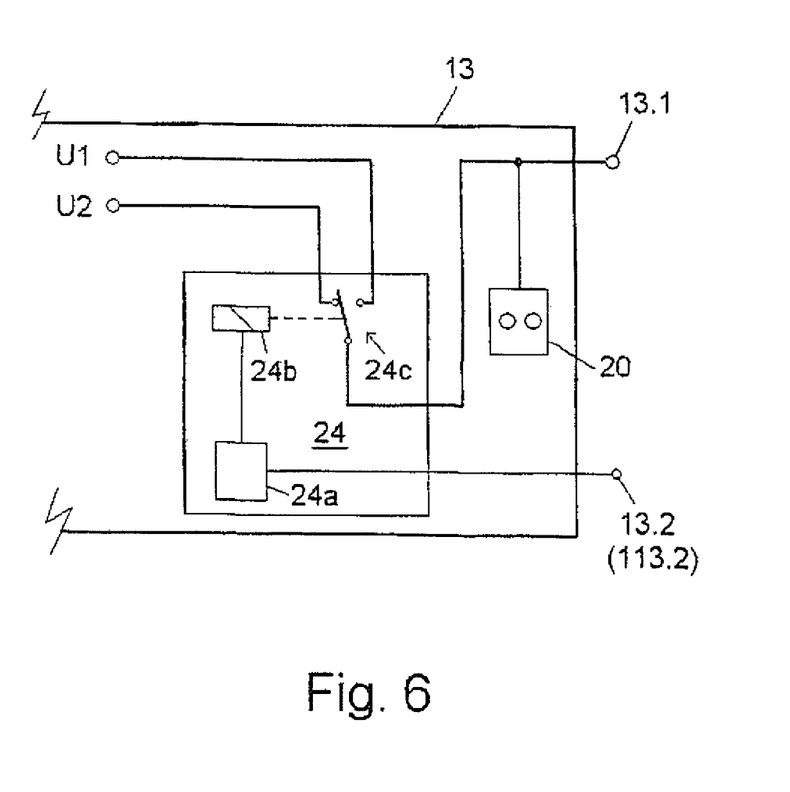
FIG. 6 shows a schematic block diagram of an exemplary embodiment of a switchover unit of the power supply device according to FIG. 2.

A further example of the switchover of the voltages U1 and U2 is shown in FIG. 6 in a schematic block diagram of an exemplary embodiment of a switchover unit 24 of the power supply device 5 according to FIG. 2.

The switchover unit 24 has an activator 24a, e.g., a switching transistor, which is connected to a switchover element 24b, e.g., a relay having a switchover contact 24c. The activator 24a is connected to an input terminal 13.2.

The switchover contact 24c is connected at its output to the output terminal 13.1 of the secondary unit 13. The operating voltage U1 is applied to one of the two inputs of the switchover contact 24c and the idle voltage U2 is applied to the other of the two inputs.

The idle state is shown in FIG. 6. In this case, the switchover contact 24c is switched, e.g., deenergized, in such a manner that the idle voltage U2 is connected via the switchover contact 24c to the output terminal 13.1.

The display unit 20 is connected to the output terminal 13.1 here. By means of a voltage selection device (not shown), the respective state is displayed using an assigned display element.

In this exemplary embodiment, the power supply device 5 generates both the operating voltage U1 and also the idle voltage U2. Depending on the signal at the input terminal 13.2, the operating voltage U1 or the idle voltage U2 is applied to the output terminal 13.1.

The input terminal 13.2 is connected in the three-wire embodiment, described briefly above, to the control line 113.2 of the motor controller 6. However, it can also be activated by the load recognition unit 17 using the control block 19. This also applies for a so-called two-wire embodiment.

In the three-wire embodiment, the additional control line 113.2 is connected and/or coupled via the motor controller 6 to the manual control 7. The other two lines or wires of the three-wire embodiment are a positive line and a negative line of the supply cable 111. In the two-wire embodiment, only positive and negative lines are provided.

The idle voltage U2 can also be generated by means of tapping the transformer of the transformer unit.

Figure 7:
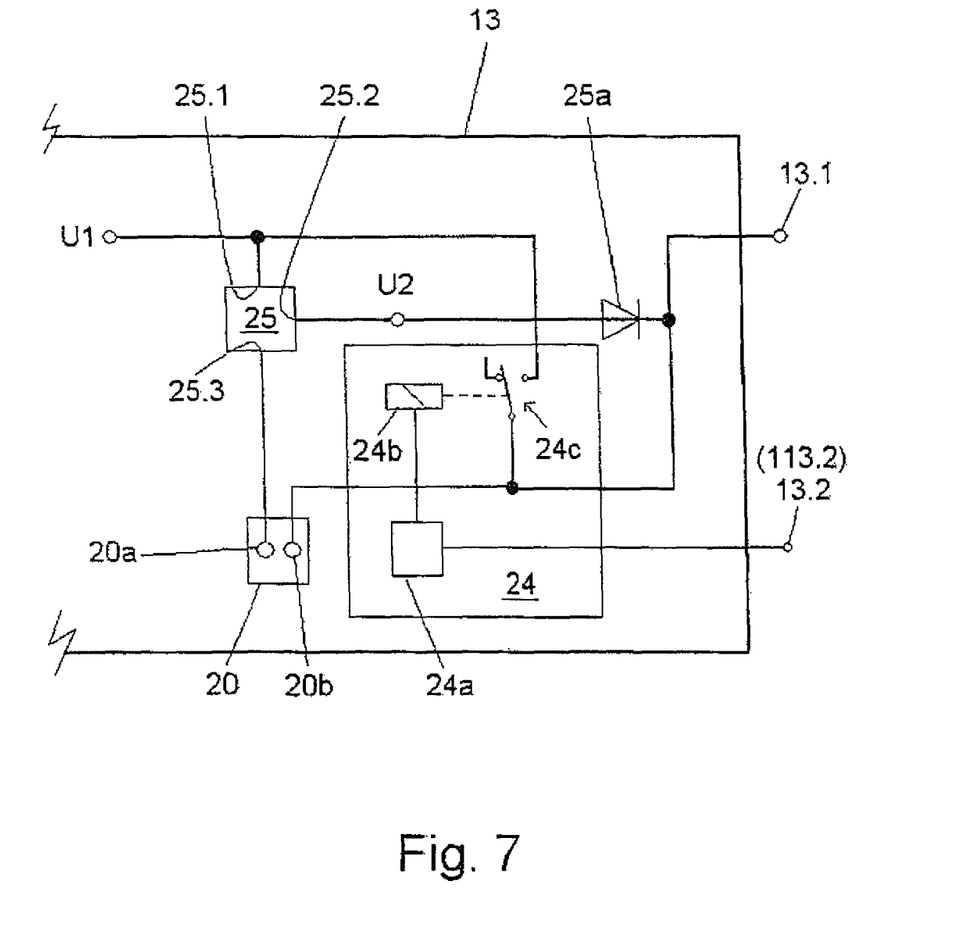
FIG. 7 shows a schematic block diagram of an exemplary embodiment of generation of an idle voltage of the power supply device according to FIG. 2.

FIG. 7 shows a schematic block diagram of an exemplary embodiment of generation of an idle voltage U2 of the power supply device 5 according to FIG. 2.

The switchover unit 24 is constructed as in FIG. 6. In contrast thereto, the switchover contact 24c is only used here as a switch-on contact or closer and is connected to the operating voltage U1. The output of the switchover contact 24c is applied to the output terminal 13.1 as in FIG. 6.

The power supply device 5 continuously generates the operating voltage, both in the operating state and also in the idle state.

The idle voltage U2 is generated by a voltage regulator 25, it is connected at an input terminal to the operating voltage U1. Its output terminal is connected via a feed diode 25a to the output terminal 13.1, wherein the cathode of the feed diode 25 is applied to the output terminal, since the positive lines are shown here. In the case of another polarization, the diodes are also to be respectively adapted. In this manner, the idle voltage U2 is always applied to the output terminal 13.1.

If the operating state is set by a signal at the input terminal 13.2 by switching over the switchover contact 24c of the switchover unit 24, the operating voltage U1 is applied in addition to the idle voltage U2 to the output terminal 13.1. Feedback of the higher operating voltage U1 on the voltage regulator 25 is prevented by the feed diode 25a.

The display unit 20 is used here having a first voltage display 20a, e.g., an LED, in the low cross current of the voltage regulator, whereby additional activation is omitted. This first voltage display 20a displays the idle voltage U2. A second voltage display 20b, e.g., also an LED, is connected to the output terminal 13.1 via a Zener diode (not shown) and only illuminates when the voltage at the output terminal 13.1 assumes the voltage U1 and is higher than the Zener voltage of this Zener diode. Of course, another voltage selection device can also be used. The two voltage displays 20a and 20b can be implemented as a double LED. Since the first LED 20a illuminates continuously and the second LED 20b is switched on in addition thereto, it is advisable if these LEDs display different colors. A two-color LED is provided for this purpose.

If the idle voltage U2 in the idle state in the magnitude of approximately 5 V is applied to the motor controller 6, the electric motor of the linear drive 2 cannot be moved therewith. However, when it is turned on or when the control relay is turned on, a current flows, which does not necessarily result in the attraction of this relay, but induces a voltage drop at the sensor 21 of the load recognition unit 17 and, as described, triggers the power supply device 5 from the idle state into the operating state to deliver the supply voltage U1 to operate the linear drive 2.

With regard to FIG. 2, in which the network circuit breaker 9 is shown, it can—depending on its type and implementation—recognize the idle state of the power supply device 5 in this idle state and perform a release of the household installation. In this case, the test voltage which is then fed to the household installation from the network circuit breaker (e.g., DC voltage at a specific level) can then be sufficient to operate the power supply device 5 in minimal idle operation in the idle state thereof, in such a manner that the idle voltage U2 is less than 5 V, but is nonetheless sufficient to generate a detectable voltage drop if an actuation is desired in the load recognition unit 17.

The power supply device 5 is then switched over in the above explained manner into the operating state, which has the result that this is recognized by the test voltage of the network circuit breaker 9 and the household installation is switched back to the power supply network 100.

This relates to a plurality of different network circuit breakers 9.

In another embodiment of the power supply device 5, a switchable and/or variable initial load is provided, which is temporarily connectable in the intermediate circuit 11 or in the input circuit 10 to the terminals of the network cable 110, in order to ensure an unambiguous recognition of the operating state of the power supply device 5 by the test voltage of the network circuit breaker 9. This initial load can be, for example, a resistor or a MOSFET switched as a variable resistor or a capacitor, which is disconnected again by the network circuit breaker 9 in the event of completed recognition. This switching off of the initial load can be triggered by the load recognition unit 17.

The above-described exemplary embodiments do not restrict the invention. It is modifiable in the scope of the appended claims.

It can thus be conceivable that the motor controller 6 and/or the manual control 7 is/are provided with an additional auxiliary power source. This auxiliary power source can be, for example, a battery/rechargeable battery/a capacitor and can also be used for emergency lowering.

The power supply network 100 can also be a direct-current network or a battery/an accumulator.

It is conceivable that the switching element 24b of the switchover unit 24 can have one or more semiconductor switches.

The invention claimed is:

1. An electric-motor furniture drive, comprising:
a power supply device including a network terminal which is connectable to a network and having an operating state in regular operation of the electric-motor furniture drive and an idle state when the electric-motor furniture drive is not actuated, said power supply device configured for transforming a network-side input voltage into at least one output-side low voltage and having a isolation transformer or a transformer unit for electrical disconnection between a network-connected input side and a low-voltage-providing output side for operating the electric-motor furniture drive, said power supply device constructed as a switched power supply and including an intermediate circuit, a control unit for controlling the switched power supply, and a secondary unit,
a manual control for adjusting movable furniture components relative to one another;
at least one electric motor which is reversible in a rotational direction;
a speed reduction gear connected downstream of the at least one electric motor; and
a further gear connected downstream of the speed reduction pear,
wherein the power supply device provides at its output an output-side operating voltage in its operating state and provides at its output an output-side idle voltage, instead of the operating voltage, in its idle state,
wherein the power supply device includes a load recognition unit having a sensor, and a control block connected to the secondary unit and configured to switch over the output-side operating voltage into the output-side idle voltage, said control block being connected to a reference voltage unit of the secondary unit.

2. The electric-motor furniture drive of claim 1, wherein the control block is connected to a switchover unit of the secondary unit.

3. The electric-motor furniture drive of claim 2, wherein the switchover unit has a switching element, which in a deenergized state switches the idle voltage at the output side to the output of the power supply device.

4. The electric-motor furniture drive of claim 1, wherein the load recognition unit has a comparator.

5. The electric-motor furniture drive of claim 4, wherein the comparator is connected to a reference unit.

6. The electric-motor furniture drive of claim 1, further comprising a voltage regulator for generating the idle voltage, said voltage regulator being connected to the operating voltage as the input voltage.

7. The electric-motor furniture drive of claim 6, wherein the idle voltage is continuously connected to the output of the power supply device, with the operating voltage being switched in in the operating state.

8. The electric-motor furniture drive of claim 6, wherein the idle voltage is continuously connected to the output of the power supply device, with the operating voltage being switched in in the operating state.

9. The electric-motor furniture drive of claim 1, wherein the power supply device has a display unit for displaying the operating voltage and the idle voltage.

10. The electric-motor furniture drive of claim 1, wherein the power supply device is provided with a switchable and/or variable initial load, which is configured and temporarily connectable to terminals of a network cable such that an unambiguous recognition of the operating state of the power supply device is formed for a network circuit breaker.

11. The electric-motor furniture drive of claim 1, further comprising a motor controller connectable to the power supply device and provided with an auxiliary power source.

12. The electric-motor furniture drive of claim 11, wherein the auxiliary power source is a member selected from the group consisting of battery, accumulator, and capacitor.

13. The electric-motor furniture drive of claim 1, wherein the manual control is provided with an auxiliary power source.

14. The electric-motor furniture drive of claim 13, wherein the auxiliary power source is a member selected from the group consisting of battery, accumulator, and capacitor.

15. An electric-motor furniture drive, comprising:
a power supply device including a network terminal which is connectable to a network and having an operating state in regular operation of the electric-motor furniture drive and an idle state when the electric-motor furniture drive is not actuated, said power supply device configured for transforming a network-side input voltage into at least one output-side low voltage and having a isolation transformer or a transformer unit for electrical disconnection between a network-connected input side and a low-voltage-providing output side for operating the electric-motor furniture drive, said power supply device constructed as a switched power supply and including an intermediate circuit, a control unit for controlling the switched power supply, and a secondary unit,
a manual control for adjusting movable furniture components relative to one another;
at least one electric motor which is reversible in a rotational direction;
a speed reduction gear connected downstream of the at least one electric motor; and
a further gear connected downstream of the speed reduction gear,
wherein the power supply device provides at its output an output-side operating voltage in its operating state and provides at its output an output-side idle voltage, instead of the operating voltage, in its idle state,
wherein the power supply device includes a load recognition unit having a comparator and a sensor, and a control block connected to the secondary unit and configured to switch over the output-side operating voltage into the output-side idle voltage,
wherein the comparator is connected to a reference unit, said reference unit comprising a constant current source.

16. The electric-motor furniture drive of claim 15, wherein the constant current source of the reference unit has two parallel current paths having one pair of pnp-transistors and one pair of npn-transistors.

17. The electric-motor furniture drive of claim 15, wherein the control block is connected to a switchover unit of the secondary unit.

18. The electric-motor furniture drive of claim 17, wherein the switchover unit has a switching element, which in a deenergized state switches the idle voltage at the output side to the output of the power supply device.

19. The electric-motor furniture drive of claim 15, wherein the load recognition unit has a comparator.

20. The electric-motor furniture drive of claim 15, further comprising a voltage regulator for generating the idle voltage, said voltage regulator being connected to the operating voltage as the input voltage.

21. The electric-motor furniture drive of claim 15, wherein the power supply device has a display unit for displaying the operating voltage and the idle voltage.

22. The electric-motor furniture drive of claim 15, wherein the power supply device is provided with a switchable and/or variable initial load, which is configured and temporarily connectable to terminals of a network cable such that an unambiguous recognition of the operating state of the power supply device is formed for a network circuit breaker.

23. The electric-motor furniture drive of claim 15, further comprising a motor controller connectable to the power supply device and provided with an auxiliary power source.

24. The electric-motor furniture drive of claim 23, wherein the auxiliary power source is a member selected from the group consisting of battery, accumulator, and capacitor.

25. The electric-motor furniture drive of claim 15, wherein the manual control is provided with an auxiliary power source.

26. The electric-motor furniture drive of claim 25, wherein the auxiliary power source is a member selected from the group consisting of battery, accumulator, and capacitor.

* * * * *